United States Patent [19]
Buerger

[11] 3,746,397
[45] July 17, 1973

[54] WHEEL TRIM ASSEMBLY
[75] Inventor: Herbert Buerger, Walton, N.Y.
[73] Assignee: Del-Met Corporation, Walton, N.Y.
[22] Filed: Dec. 15, 1971
[21] Appl. No.: 208,154

[52] U.S. Cl. ............................................. 301/37 R
[51] Int. Cl. ............................................. B60b 7/06
[58] Field of Search ..................... 301/37 R, 37 CD

[56] References Cited
UNITED STATES PATENTS
| 3,322,468 | 5/1967 | Spisak | 301/37 R |
|---|---|---|---|
| 2,186,550 | 1/1940 | Lyon | 301/37 R |
| 2,926,959 | 3/1960 | Lyon | 301/37 CD |
| 3,012,823 | 12/1961 | Spisak | 301/37 R |

Primary Examiner—Richard J. Johnson
Attorney—J. B. Felshin

[57] ABSTRACT

A wheel trim, such as a wheel cover, is attached to an annular ring. Clips are mounted on said ring in angularly spaced relation, for slight or limited self-adjusting, circumferential and radial movement. Each clip has a central hook to engage the upper surface of a flange of a tire receiving rim, and a pair of side hooks to engage the undersurface of said flange.

16 Claims, 4 Drawing Figures

PATENTED JUL 17 1973    3,746,397

INVENTOR.
HERBERT BUERGER
BY
J.B. Felshin
ATTORNEY

WHEEL TRIM ASSEMBLY

This invention relates to a wheel trim assembly for automobile wheels and means for attaching such assembly to the tire receiving rims of said wheels.

One object of this invention is to provide a construction of the character described in which a wheel trim such as a wheel cover is attached to an annular flat ring on which clips are mounted for slight self-adjusting movement circumferentially and radially, such clips having means to engage opposed surfaces of an outer flange of the tire receiving rim, whereby to mount the wheel cover on the wheel.

Another object of this invention is to provide a construction of the character described in which the clips are equiangularly spaced on the annular ring and in which each clip comprises a central hook engaging an outer surface of said flange of the rim and a pair of hook portions located on opposite sides of said central hook portion to engage inner surface of said tire rim flange.

A further object of this invention is to provide a strong, rugged, and durable construction of the character described which shall be relatively inexpensive to manufacture, easy to install, and which shall yet be practical and efficient to a high degree in use.

Other objects of this invention will in part be obvious and in part hereinafter pointed out.

The inventor accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, FIG. 1 is a front view of an automobile wheel and wheel trim assembly embodying the invention;

Figure 1:
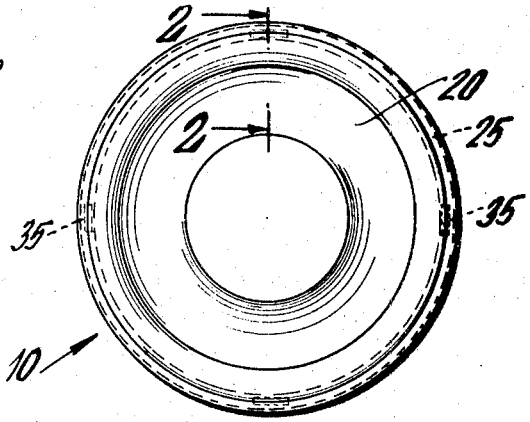
Figure 2:
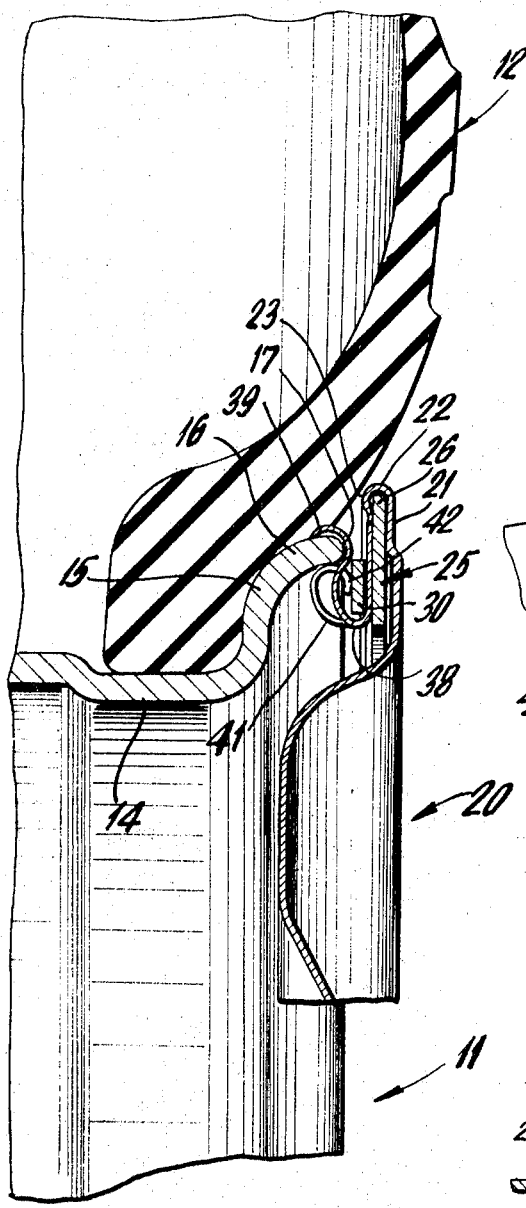
FIG. 2 is an enlarged cross-sectional view taken on line 2—2 of FIG. 1.
Figure 3:
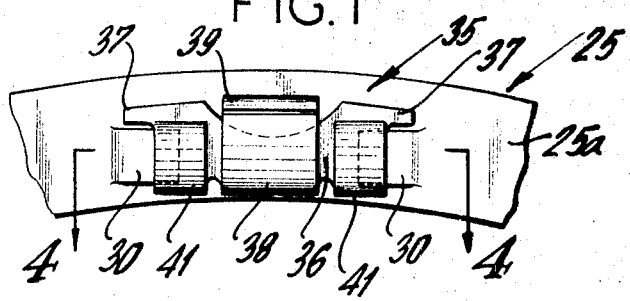
FIG. 3 is a partial inside view of the annular ring and a clip mounted thereon.

Referring now in detail to the drawing 10, designates an automobile wheel embodying the invention. Said wheel comprises a tire receiving rim 11 on which an automobile tire 12 is mounted. The tire receiving rim 11 comprises an annular depressed wall 14 having at its outer side a radially and axially outwardly inclined flange 15 terminating in a curved outer end annular portion 16 having an annular edge 17. The wheel 10 is provided with a wheel cover or other wheel trim 20 having an annular, radial wall 21 disposed in a vertical plane. Said wall 21 has a bent back portion 22 terminating in a radially inwardly extending flange 23. An annular flat ring 25 contacts the inner face of wall 21. The bent back portion 22 surrounds the outer edge 26 of ring 25 and the rim edge 23 grips said outer edge of the ring and clamps the ring against wall 21.

Figure 4:
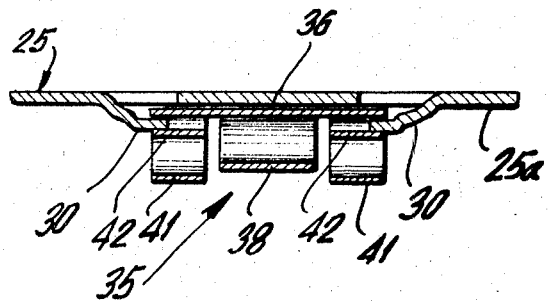
FIG. 4 is a cross-sectional view taken on line 4—4 of FIG. 3.

Said ring 25 is formed at equiangularly spaced portions thereof, with pairs of similar, symmetrical tabs 30 cut from the metal of said ring. The pairs of tabs 30 may be located at four, 90° spaced positions of said ring. The tabs 30 project from ring 25 toward the wheel rim 11 and extend toward each other. Said tabs 30 are spaced from the inner surface 25a of ring 25, as shown in FIG. 4.

Mounted on and between each pair of tabs 30 is a clip 35. Each clip 35 comprises a back wall 36 which lies against said inner surface 25a and extends loosely between the tabs 30 and said ring, so that said clip can move slightly for self-adjustment in a circumferential direction. Extending from the radially outer portion of back wall 36 are wings 37 which are disposed slightly above tabs 30 and permit radial self- adjustment of the clips relative to the ring.

Extending from the lower end of back wall 36 is a central, upwardly and inwardly upturned hook portion 38 having a reversely curved inwardly extending hook portion 39 overlapping the upper surface of the flange portion 16 of the tire receiving rim 11. Said hook portion 39 engages beneath the tire 12 and lodges between a portion of the tire and the upper surface of the flange portion 16 of the tire receiving rim 11.

Extending also from the lower end of back wall 36 and located on opposite sides of longer finger 38, 39 in spaced relation thereto, are a pair of shorter, similar curved fingers 41 which are coiled upwardly and then axially outwardly, and then radially inwardly terminating in downwardly curved end portions 42 contacting the inner surfaces of tabs 30.

Said fingers 41 contact or grip the undersurface of the tire receiving rim portion 16. The tire rim flange portion 16, 17 is thus received between the hook portion 39 of the longer central finger 38, 39 and the pair of shorter fingers 41.

This trim assembly 20, 25, 35 is easy to install because there is only one finger of each clip to insert between the tire and tire receiving rim. The clips furthermore can be circumferentially and radially moved to conform to variation in shape and size of the ring 25, and rim 11. The assembly is self-sizing to accommodate rims which are not perfect circles or if there are different tolerances. No welding is necessary with the present construction.

In practice, the clips can be first installed by hand on the tire rim, and then the ring can be applied to the clips and the tabs 30 can be closed by a die.

Fingers 41 extend beneath and around the tabs 30, and wings 37 extend above the tabs so that the clips can move slightly circumferentially and radially but the clips cannot be removed from the ring. If the clips are moved radially inwardly the wings 37 contact the tabs.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A vehicle wheel assembly comprising a tire receiving rim, having a radially and axially outwardly extending flange terminating in an outer edge and having an upper surface and an undersurface, a wheel trim, a plurality of clips, tab means adapted to mount said clips on said trim in angularly spaced positions and to permit limited radial and circumferential movement of said clips relative to said wheel trim, each clip having a central longer finger engaging the upper surface of said flange, and a pair of shorter fingers disposed on opposite sides of said central finger, and engaging the undersurface of said flange.

2. The combination of claim 1, said clips each comprising a back wall from one side of which said fingers extend, a ring having an outer annular edge and tabs struck therefrom and engaging said back wall, and said trim having means to grip said outer annular edge of said ring.

3. The combination of claim 1, said means to mount said clips on said trim comprising a single flat annular ring having an outer annular edge and disposed in a vertical plane, said trim having an outer circumferential portion gripping the outer annular edge of said flat ring, said ring having said tab means to attach said clips to said ring.

4. The combination of claim 3, said means to attach said clips to said ring comprising means to attach said clips to said ring while allowing limited movement of said clips relative to said ring circumferentially and radially.

5. The combination of claim 1, said means to mount said clips on said trim comprising a flat annular ring, means to mount said trim on said ring, means to attach said clips to said ring, and the pair of shorter fingers of said clips being in contact with said ring.

6. The combination of claim 5, said clips each comprising a back wall from one side of which said fingers extend, said means to attach said clips to said ring comprising tabs on said ring engaging the back wall of each clip, and said means to mount said trim on said ring comprising a bead on said trim engaging the outer annular edge of said ring.

7. A vehicle wheel assembly comprising a tire receiving rim, having a radially and axially outwardly extending flange terminating in an outer edge and having an upper surface and an undersurface, a wheel trim, a plurality or clips, means to mount said clips on said trim in angularly spaced positions, each clip having a central longer finger engaging the upper surface of said flange, and a pair of shorter fingers disposed on opposite sides of said central finger, and engaging the undersurface of said flange, said clips each comprising a back wall from one side of which said fingers extend, a ring having tabs engaging said back wall, and said trim having means to grip said ring, said pair of fingers extending beneath said tabs, said back wall having outwardly extending wings disposed above said tabs, said back wall lying against one surface of said ring and being disposed between said tabs and said surface of said ring.

8. The combination of claim 7, the tabs of each pair of said tabs, projecting toward each other and being spaced from said surface of said ring.

9. The combination of claim 7, said back wall having outwardly extending wings overlying upper edge portions of said tabs.

10. A vehicle wheel assembly comprising a wheel trim, a flat annular ring, means to attach said trim to said ring, a plurality of angularly spaced clips, tab means attaching said clips to said ring for limited circumferential and radial movement, said clips each having means to grip an upper surface and an undersurface of a flange of a tire receiving wheel rim.

11. The combination of claim 10, said ring being disposed between said trim and said clips.

12. The combination of claim 11, said means to attach each of said clips to said ring comprising a pair of tabs on said ring, and said clips each having portions disposed between said tabs and said ring.

13. The combination of claim 12, said means to attach said trim to said ring comprising an annular portion on the outer periphery of said trim bent back over the outer periphery of said ring and gripping said ring.

14. The combination of claim 10, said means on said clips to grip an upper surface and an undersurface of a flange of a tire receiving wheel rim, comprising a central longer finger having means to grip the upper surface of said flange, and a pair of shorter fingers on opposite sides of said central finger, and having means to grip the undersurface of said flange.

15. The combination of claim 14, said ring being disposed between said trim and said clips, said means to attach said clips to said ring comprising pairs of tabs on said rings, and each of said clips having a back wall portion interposed between a pair of said tabs and said ring, said pair of shorter fingers extending from said back wall around the under edges of said tabs, said central finger also extending from said back wall.

16. The combination of claim 15, said back wall having outwardly extending wings overlying upper edge portions of said tabs, and said clips being slightly movable on said ring circumferentially and radially.

* * * * *